(12) United States Patent
Pangam (10) Patent No.: US 11,960,861 B1
(45) Date of Patent: Apr. 16, 2024

(54) SYSTEM AND METHOD FOR CODE DEVELOPMENT TOOLS EXISTING WITHIN CODE CONTAINER

(71) Applicant: Morgan Stanley Services Group Inc., New York, NY (US)

(72) Inventor: Viraj Sanjay Pangam, Maharashtra (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/350,289

(22) Filed: Jul. 11, 2023

(51) Int. Cl.
*G06F 8/30* (2018.01)
*G06F 8/41* (2018.01)
*H04L 67/02* (2022.01)

(52) U.S. Cl.
CPC .......... *G06F 8/30* (2013.01); *G06F 8/41* (2013.01); *H04L 67/02* (2013.01)

(58) Field of Classification Search
CPC .............................. G06F 8/30–41; H04L 67/02
USPC .................................................. 717/100–121
See application file for complete search history.

(56) References Cited

U.S. PATENT DOCUMENTS

| | | | | |
|---|---|---|---|---|
| 7,333,999 B1 * | 2/2008 | Njemanze | ................. | G06F 8/33 707/999.102 |
| 8,032,940 B1 * | 10/2011 | Dhanani | ............. | G06F 21/6218 726/26 |
| 8,271,520 B1 * | 9/2012 | Aman | ....................... | G06F 8/34 707/769 |
| 8,329,283 B2 * | 12/2012 | Takagi | ..................... | G21B 1/13 428/920 |
| 8,954,928 B2 * | 2/2015 | Clemm | .................... | G06F 8/71 717/122 |
| 9,262,300 B1 * | 2/2016 | Haba | ..................... | G06F 11/362 |
| 9,454,363 B1 * | 9/2016 | Angell | ..................... | G06F 8/71 |
| 9,459,769 B1 * | 10/2016 | DeLuca | .................. | H04L 67/02 |
| 9,733,933 B1 * | 8/2017 | Arquero | .................... | G06F 8/33 |
| 9,851,871 B2 * | 12/2017 | DeLuca | ............. | G06F 16/9562 |
| 10,339,299 B1 * | 7/2019 | Magnuson | ............ | H04L 9/3239 |
| 10,635,566 B1 * | 4/2020 | Talluri | .................. | G06F 9/4488 |

(Continued)

OTHER PUBLICATIONS

Weber, "Code is not just text: Why our code editors are inadequate tools", ACM, pp. 1-3 (Year: 2017).*

(Continued)

*Primary Examiner* — Anil Khatri
(74) *Attorney, Agent, or Firm* — PEARL COHEN ZEDEK LATZER BARATZ LLP (57) ABSTRACT

An embodiment of the present invention may enable editing and deployment of software by including in an application container editable source code used to produce an application, and tools to edit and build the application, such as a code editor and a build tool to convert the source code to the executable application. The container may include an executable application which may execute in the environment on which the container is saved. A server in the container may control execution of the executable application and build the executable application. A remote user computer may communicate with the code editor to edit the source code, which in its updated version may be built to produce an updated version of the executable application. The server may stop execution of the existing executable application, and start execution of the updated version of the executable application.

16 Claims, 4 Drawing Sheets

(56) References Cited

U.S. PATENT DOCUMENTS

| | | | |
|---|---|---|---|
| 11,204,690 B1* | 12/2021 | Hoberman | G06F 3/04842 |
| 11,237,952 B1* | 2/2022 | Pearson | G06F 8/41 |
| 11,838,296 B1* | 12/2023 | Rossman | G06F 8/71 |
| 11,853,746 B2* | 12/2023 | Groenewegen | G06F 11/3688 |

OTHER PUBLICATIONS

Mészáros et al, "Delivering comprehension features into source code editors through LSP", IEEE, pp. 1581-1586 (Year: 2019).*

Hall et al, "A Cooperative Approach to Support Software Deployment Using the Software Dock", ACM, pp. 174-183 (Year: 1999).*

Oreizy et al, "An Architecture Based Approach to Self Adaptive Software", IEEE, pp. 54-62 (Year: 1999).*

Constantino et al, "Understanding Collaborative Software Development: An Interview Study", ACM, pp. 55-65 (Year: 2020).*

Franky, "Agile Management and Development of Software Projects based on Collaborative Environments", ACM, pp. 1-6 (Year: 2011).*

About—Coder is an open source platform for creating and managing developer workspaces in your preferred clouds and servers, 2023 Coder Technologies, Inc., Coder v2 Docs.pdf, https://coder.com/docs/v2/latest , downloaded on May 29, 2023, 5 pages.

Coder—Your self-hosted remote development platform, 2023 Coder Technologies, Inc., https://coder.com/ , downloaded on May 29, 2023, 14 pages.

Milligan, Mark, Coder-Blog—Deploying Coder on Red Hat OpenShift Kubernetes Infrastructure, https://coder.com/blog, Apr. 29, 2023, downloaded May 29, 2023, 12 pages.

Enterprise—Coder v2 Docs, Home/Enterprise, Enterprise, 2023 Coder Technologies, Inc., https://coder.com/docs/v2/latest/enterprise, downloaded May 29, 2023, 4 pages.

Enterprise Pricing—Coder, Open Source, Free, 2023 Coder Technologies, Inc., https://coder.com/pricing, downloaded May 29, 2023, 3 pages.

Coder/Code—Marketplace, Extension Marketplace for VS code, AGPL-3.0 license, https://github.com/coder/code-marketplace, downloaded May 29, 2023, 6 pages.

Coder/Coder, A tool that provisions remote development environments via Terraform, AGPL-3.0 license, https://github.com/coder/coder, downloaded May 29, 2023, 4 pages.

GitHub—Coder/Presskit, Press kit and brand assets for Coder.com, Coder.com Brand, https://github.com/coder/presskit, downloaded May 29, 2023, 4 pages.

Dykstra, Tom, Ross, Chris, and Halter, Stephen, Kestrel Web Server in asp.net Core, https://learn.microsoft.com/en-us/aspnet/core/fundamentals/servers/kestrel?view=aspnetcore-7.0, dated Apr. 4, 2023, downloaded Jul. 11, 2023, 2 pages.

Coder—Become a partner of Code, https://coder.com/partners, downloaded May 29, 2023, 2 pages.

Coder—Request a Demo of Coder Enterprise, https://coder.com/demo, downloaded May 29, 2023, 2 pages.

What is a container—Docker, Development Shipment and Deployment, https://www.docker.com/resources/what-container/, downloaded Jun. 5, 2023, 8 pages.

Why Coder—Coder, 2023 Coder Technologies, Inc., https://coder.com/why, downloaded May 29, 2023, 2 pages.

* cited by examiner

SYSTEM AND METHOD FOR CODE DEVELOPMENT TOOLS EXISTING WITHIN CODE CONTAINER

FIELD OF THE INVENTION

The present invention relates generally to code development for software, for example including bundling a code editor and build tools within a software application container.

BACKGROUND OF THE INVENTION

Computer systems and technologies exist to edit and develop computer software. Such software is often deployed using container technology to run applications. Containerization may be a virtualization technique allowing software applications to be run in isolated user spaces called containers, in different environments. Containers may be fully functional and portable computing environments surrounding the application and keeping them independent from other parallelly running environments. A container may package code and its dependencies so the application runs quickly and reliably across different computing environments.

A container-based deployment is different from a traditional deployment (e.g. from a particular server or virtual machine (VM)). Each container may be built with and include a different operating system image, and these different containers can run on a particular operating system. A container may execute as an isolated process. To enable this the host operating system (OS) may support a container engine such as provided by the Docker system which is capable of running a containerized application. The host OS kernel may be shared among all the containers.

However, the container development cycle, e.g. build and test, is expensive when the application developers test their applications in an environment lower than that of production, such as a quality assurance (QA) environment (e.g., non-production, non-local development environment, where the local environment is typically the computer of the application developer). For example, in the case that a developer forgets to put a simple log statement in code while investigating an issue, or needs to log additional information, the developer may have to go through the entire process of, e.g.:
1) Pushing the change to a change management system like the Git system;
2) Triggering a build on a build server which may involve:
   a. Checking out the code, e.g. from the Git system;
   b. Building the application;
   c. Running unit test cases;
   d. Packaging the build artifacts and dependencies into a container; and
   e. Pushing the container to some repository; and
3) Perform the deployment to the required environment.
This lengthens the time it takes to develop software.

SUMMARY OF THE INVENTION

An embodiment of the present invention may enable editing and deployment of software by including in an application container editable source code used to produce an application, and tools to edit and build the application, such as a code editor and a build tool to convert the source code to the executable application. The container may include an executable application which may execute in the environment on which the container is saved. A server in the container may control execution of the executable application and build the executable application. A remote user computer may communicate with the code editor to edit the source code, which in its updated version may be built to produce an updated version of the executable application. The server may stop execution of the existing executable application, and start execution of the updated version of the executable application.

A system and method may deploy and allow for quick and easy editing of software. A process may bundle or save in a data structure, such as an application container, components such as an executable application; source code used to produce the executable application; a code editor; and a server to control execution of the executable application and to build the executable application. The code editor may communicate with a remote process (e.g. a web browser on a user computer remote from the location of the container) to edit the source code to produce updated source code. The server may compile or build an updated version of the executable application based on the updated source code, stop execution of the executable application, and start execution of the updated version of the executable application.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments may improve the technology of software development and deployment by allowing for quick and easy editing of software. A process may bundle or save in a data structure such as an application container an executable application which may execute in the environment on which the container is saved. Also in the container may be bundled editable source code used to produce the executable application; a code editor; a build tool to convert source code and other information to the executable application; and a server to control execution of the executable application and to build the executable application. The code editor may communicate with a remote process (e.g. a web browser on a user computer remote from the location of the container, such as via HTTPS) to edit the source code to produce updated source code to be saved in the container. The server may compile or build an updated version of the executable application (in conjunction with a build tool), stop execution of the executable application, and start execution of the updated version of the executable application. The executable application may execute from the container: in some embodiments, while (e.g. concurrently with application execution) an application is executing, a programmer may use the bundled editor to edit the code or, e.g., to add or modify a log statement (e.g. logging state of system, or for debugging), stop the application (e.g. using the server), rebuild the application with the change to the code, and restart the application. Prior art containers include only executable code, and modifying that code is burdensome. Embodiments of the present invention improve software development technology by allowing for modification of software without the requirement that a new container image be built.

The code editor may be a relatively lightweight, e.g. small and reduced functionality, editor, to not add a large amount of content to the container, but in some embodiments may be a larger, typical size editor. The editor, at the user side (typically remote from the location of the container), may be, or interface with a user via, e.g., a browser, and the code to operate the editor may be in the container, e.g. in a server in the container.

Embodiments of the invention may save, package or bundle in the application container, along with the actual application, e.g. executable code with dependent libraries, entities such as:

1) Application code (e.g. human editable source code which when compiled or built is used to produce the actual application); in some embodiments, a container may include more than one executable application, but typically includes only one;
2) Lightweight code editor (e.g. online editor);
3) Lightweight server to control execution of the actual application (e.g. stopping execution, starting execution), and compiling or building the actual application; and
4) Build tools, which may compile the application code, and build it, e.g. using or linking to dependent libraries, into executable code.

Figure 1:
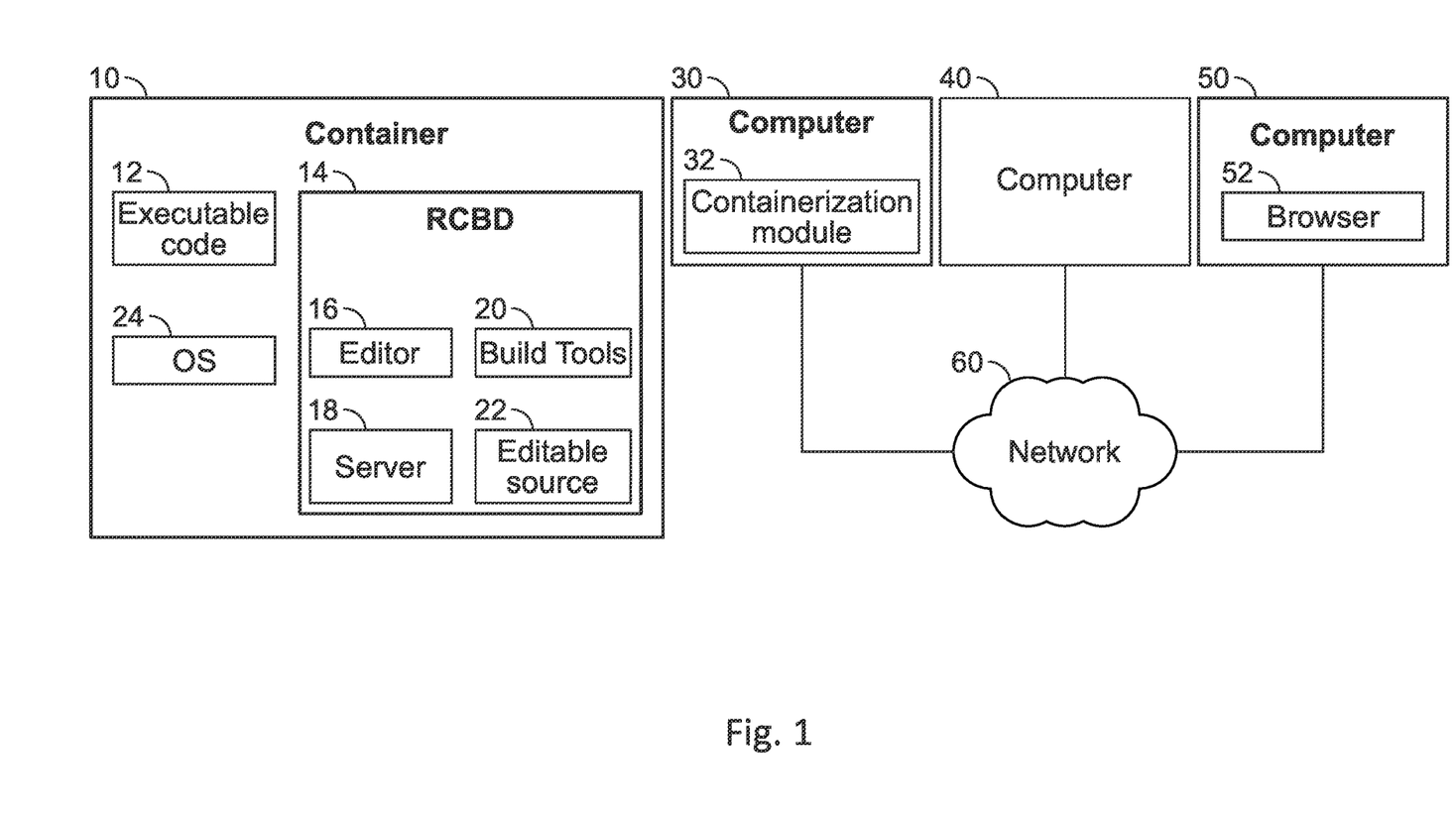
FIG. 1 depicts a system according to embodiments of the present invention.

FIG. 1 depicts a system according to an embodiment of the present invention. Referring to FIG. 1, container or bundle 10 may include application executable code 12, which may be executed inside container 10 on computer 40. (Container 10 is shown separate from computers 30, 40 and 50 but may be created on (e.g. and stored by) computer 30 and deployed to (e.g. and stored by) computer 40). Container 10 may include RCBD module (rapid code build and deploy module) 14, which may include lightweight code editor 16, lightweight server 18, build tools 20, and editable application source code 22, which may include dependencies such as dependent libraries. Editable source code 22 may include source code which when compiled and/or built produces executable code 12. In one embodiment source code 22 is C #(C Sharp, .cs) code, but other languages may be used. Container 10 may include operating system 24, in the context of which application executable code 12 is executed (possibly in conjunction with an operating system executing on the computer executing container 10), and which may control the execution of server 18; lightweight editor 16; and executable code 12. Computer 40 may be a server, cloud system, desktop, etc., and may host and execute container 10, and may be a deployment environment such as a test, QA or development environment or a production environment; computer 40 may provide an environment other than a deployment environment. Computer 30 (e.g. a server, workstation, desktop computer, cloud system, etc.) may include containerization module 32 which may create container 10 by bundling its components, after which container 10 may be deployed, e.g. to computer 40. Computer 50 may be a user computer interacting with editor 16 using a remote process such as browser 52, such that a user may interact with browser 52 to edit editable application source code 22, and control or instruct server 18 and build tools 20 to compile application source code 22 (e.g., to build an updated version of application executable code 12), and stop and start (e.g. execute) application executable code 12. Lightweight server 18 may control execution of the executable application (e.g., application executable code 12) and build the executable application, possibly with the help of (e.g. by sending an instruction to) build tools 20. Computer 50 and browser 52 may be remote, e.g. physically distant, from code editor 16; browser 52 may be a process remote from code editor 16 to edit application source code 22 to produce updated source code, e.g. an updated or revised version of application source code 22. One or more networks (e.g. the internet) 60 may connect computers 30, 40 and 50.

Using a data object such as container 10, when a software developer builds and deploys an application in a development environment (e.g. computer 40) via a standard build pipeline, RCBD module 14 may also get deployed along with application executable code 12. Lightweight server 18 which is part of RCBD module 14 can serve lightweight code editor 16. e.g. over HTTP. HTTPs or another protocol, to a remote process such as a browser accessing editor 16 via a URL. (Entities such as editor 16 may be part of server 18, or separate units.) This may improve the technology of code development, for example in a scenario where a software developer wants to log additional information or make changes to the code post deployment, e.g. after the container is created or bundled. Instead of going through the entire build and deployment process, an embodiment may allow the developer to simply, and more easily, and using less resources, access the URL on which the code editor from the RCBD module 14 is accessible via a browser. The developer may make changes to the source code. e.g. log additional information and save it. RCBD 14 may provide the ability to compile and/or build revised executable code from the revised source code after the changes are saved in RCBD module 14. Once the build finishes, RCBD 14 may terminate the executing application, then copy and replace the existing application artifacts with the newly built artifacts in the application deployment location, e.g. a folder, within the container, then RCBD 14 may start the revised executable application.

Lightweight server 18, typically part of RCBD module 14, may be considered a vehicle allowing lightweight code editor 16 to be used by an end user. RCBD module 14 or its components such as server 18 may execute side-by-side in the same container; e.g. server 18, editor 16 and application executable code 12 may execute in the same container.

A process (e.g. containerization module 32) may bundle or package a data structure such as an RCBD module along with the actual application (e.g. executable code) using a novel container build process. Potentially the build dependencies may be packaged separately in the container; however an embodiment may instead use a publicly available base image which already contains the build dependencies; such containers may already be used for building applications. These base images can very well be repurposed, have RCBD components added, and used as a container to run applications in accordance with embodiments of the invention.

Figure 2:
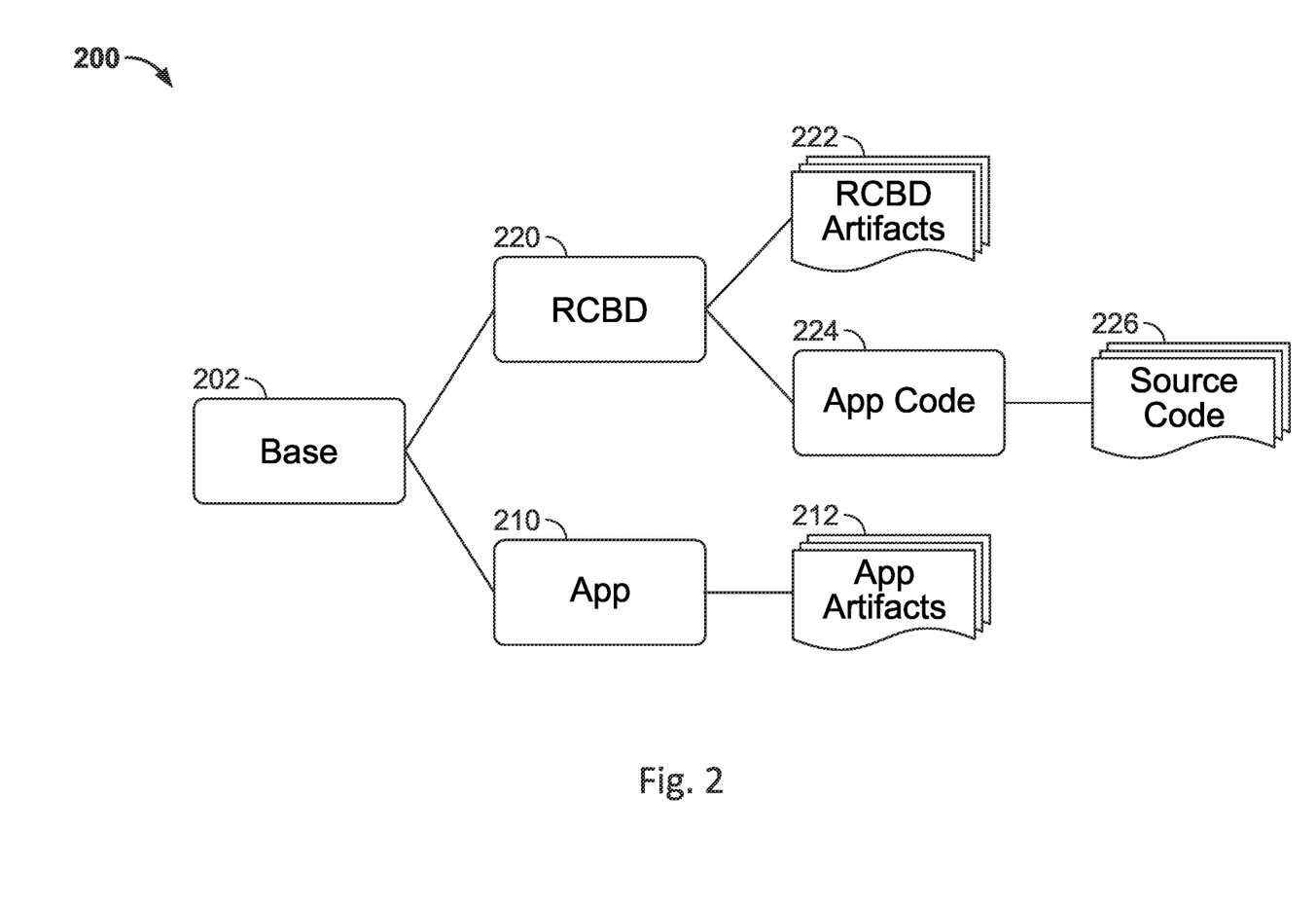
FIG. 2 depicts a sample directory structure according to an embodiment of the invention.

In one embodiment, a directory structure in the container is used to organize the components. For example, the application container may include an application directory including the executable application, and a build and deploy directory including the source code; the code editor; and the server. Other structures may be used. FIG. 2 depicts a sample directory structure within a container according to an embodiment of the invention. Directory or folder structure 200 may be referenced by a base directory 202 from which other directories depend, and may be inside of, or may organize, a data structure such as, a container. In one embodiment, build tools may be already part of the base container image (or may be created by a containerization module 32), and containerization module 32 adds other data structures such as application executable code directory or folder 210, holding application artifacts 212 such as application executable code 12, RCBD directory or folder 220, holding an RCBD including RCBD artifacts 222 (e.g. the dependencies and application libraries which are required to successfully execute the lightweight server and editor which are part of the RCBD), and an application code directory 224 holding editable source code 226 source and build dependencies. Other directory structures may be used. Application artifacts may refer to all the dependencies and application libraries which are required to successfully run the application; typically this is the output of building an application. The directory structure described may allow an RCBD module to refer to the application using relative paths. Any other kind of folder or directory structure can also be used, for example where the path to the actual application folder (e.g. containing the app artifacts) can be indicated to RCBD in some form such as environment variables, etc. While a specific structure, contents, and directory structure, of an RCBD module within a container is used, embodiments need not use an RCBD module, and may arrange components described herein in different manners.

Source code 226 (analogous to editable code 22 of FIG. 1) may include the set of files which are part of the application codebase along with the associated dependencies. These files may be served over https via code editor 16 and lightweight server 18. The user can make the necessary changes to the files as required, e.g. in a browser, and save them. Once the source file(s) are saved server 18 may:

1) Stop the running executable application 12;
2) Build the executable application 12 (e.g. produce a revised or re-built version) and deposit the new app artifacts in application executable code directory 210; and
3) Start executable application 12 again.

After successfully completing the stop, build and start operations, application 12 may execute with the new changes which the user made.

In the case a Dockerfile is used to include instructions which a containerization module may use to build a final image, in the location where a Dockerfile exists, a folder structure may exist as in the example in Table 1. The example Dockerfile described in Table 2 uses the example files and folders as in Table 1.

TABLE 1

| App | 19 May 2023 9:16 | File folder |
| RCBD | 19 May 2023 9:16 | File folder |
| Docker | 19 May 2023 9:14 | File |

In one embodiment, the App and RCBD in Table 1 may be copied or cloned from different change management system repositories (e.g. Git repositories). In other embodiments, the RCBD module may be placed in the base container image.

Table 2 depicts an example Docker file used with an embodiment:

TABLE 2

```
# The base image mcr.microsoft.com/dotnet/sdk:5.0 is used
to build RCBD and the application
FROM mcr.microsoft.com/dotnet/sdk:5.0 AS build-env
# Create a folder called Base and switch to it
WORKDIR /Base
# Copy RCBD code and the app code inside Base
in their respective folders folder
COPY ../
# Restore RCBD dependencies
RUN dotnet restore RCBD/RCBD.csproj
# Build and publish the RCBD artifacts in the
/Base/RCBD/out folder
RUN dotnet publish RCBD/RCBD.csproj -c Release -o RCBD/out
# Copy the application code in /Base/RCBD/out/AppCode
COPY ./App/ ./RCBD/out/AppCode/
# Restore Application dependencies
RUN dotnet restore App/App.csproj
# Build and publish the application in the /Base/App/out folder
RUN dotnet publish App/App.csproj -c Release -o App/out
# The base image mcr.microsoft.com/dotnet/sdk:5.0 is also
used to run the application as well
FROM mcr.microsoft.com/dotnet/sdk:5.0
# Switch to /Base directory
WORKDIR /Base
```

TABLE 2-continued

```
# Copy folders from build image to this image
COPY --from=build-env /Base/RCBD/out ./RCBD
COPY --from=build-env /Base/App/out ./App
# Start the server in the RCBD module on port 5001
ENTRYPOINT ["dotnet", "Base/RCBD/RCBD.dll",
"--urls=https://0.0.0.0:5001"]
```

In the example in Table 2, the RCBD and App are both .NET based applications; an embodiment can use the same container image to build both and deposit the artifacts to the final runtime container image (other embodiments need not do this). The RCBD and App can be written in any suitable language and built on separate containers. However, in the final image, the artifacts of both may co-exist on the same container image. Keeping the coding language of the RCBD and the actual application identical, in some embodiments, may make the process simpler.

Lightweight server 18 may have functions including for example:

1) Acting as a host to the actual executing application 12, including starting and stopping the application, which typically executes in a separate process;
2) Serving code editor 16;
3) Building application 12 after a user has finished making changes;
4) Stopping the currently executing application in the container;
5) Copying the newly built artifacts to the target location from where the application was running; and
6) Starting the application (which has the new code changes).

Lightweight server 18 may act like a host process to the actual application. On starting the server, it may spawn a new process within which application 12 starts running. After the process starts, the server may start listening for traffic on the designated port (the example application is web-based and accesses a port; non-web-based applications may be used). The example pseudo code in Table 3, in C #, summarizes these example operations:

TABLE 3

```
public static Process s_childApp;
    public static void Main(string[ ] args)
Process app = new Process( ); //Create a new Process object which
will be responsible to start the application
        app.StartInfo.FileName = "dotnet";
        app.StartInfo.Arguments = "/Base/App/App.dll -
urls=https://0.0.0.0:5000"; // Specify the location of the application
and the port on which the application will listen to
        app.Start( ); // Start the application in a new process
        s_childApp = app; // Keep a reference to the process
        to kill/restart the application
CreateHostBuilder(args).Build( ).Run( ); // After the application
starts, start the lightweight server
}
```

Table 4 includes example pseudocode in C # to stop then start a revised executable application:

TABLE 4

```
s_childApp( ).Kill( ); //Kill the existing running application
var publish = new Process( );
publish.StartInfo.FileName = "dotnet";
    publish.StartInfo.Arguments = "publish /Base/RCBD/
    AppCode/App.csproj -c
Release -o /Base/App";
    publish.Start( ); //Publish the new changes to the Application folder
    publish.WaitForExit( ); //Wait for the publish to complete
    s_childApp.Start( ); //Start the application with the new changes
```

The lightweight server may expose the code editor on one of its endpoints (e.g. a URL), e.g. over https, such that a user may access the editor using a URL advertised by the server. The code editor may show the files in a directory structure from, e.g., a /Base/RCBD/AppCode folder. The code editor may be simple with basic editing capabilities or for example larger, and modern with support for IntelliSense features, code formatting, etc. The code editor may, for example:

1) Have an ability to indicate the last change time of the file being edited;
2) Have a Save button which will update a code file in a folder such as a /Base/RCBD/AppCode folder;
3) Have an Apply button which may (e.g. via the server):
  a. Stop the currently running executable application in the same container as the editor and server;
  b. Build the executable application code with the new changes the user has made;
  c. Deposit the new artifacts in a folder such as the/Base/App folder;
  d. Execute the application with the new changes;
4) Have a status indicator which may, for example:
  a. Show the build status; and
  b. Report any failures; and
5) Reset code to original state: an editor may support resetting application source code to the original state when it was packaged. To do this an additional copy of the code may be maintained on the container and kept in a pristine state. Whenever the user executes or presses the "Reset" button, the code may be copied from the pristine location to a folder such as the Base/RCBD/AppCode folder. After that, the standard flow which happens on clicking 'Apply' button may continue.

Figure 3:
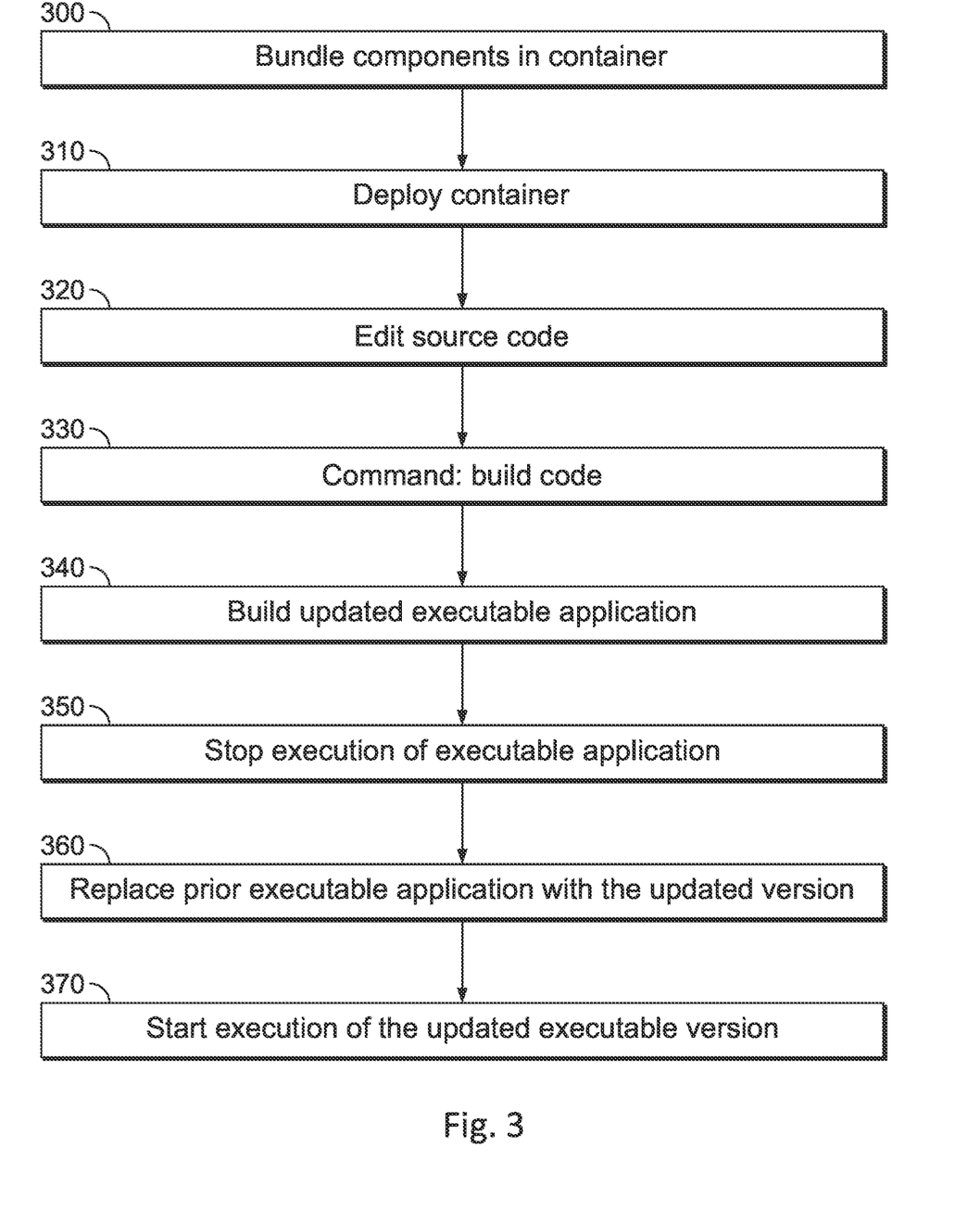
FIG. 3 is a flowchart depicting a method for deploying, editing and controlling software, according to embodiments of the invention.
Figure 4:
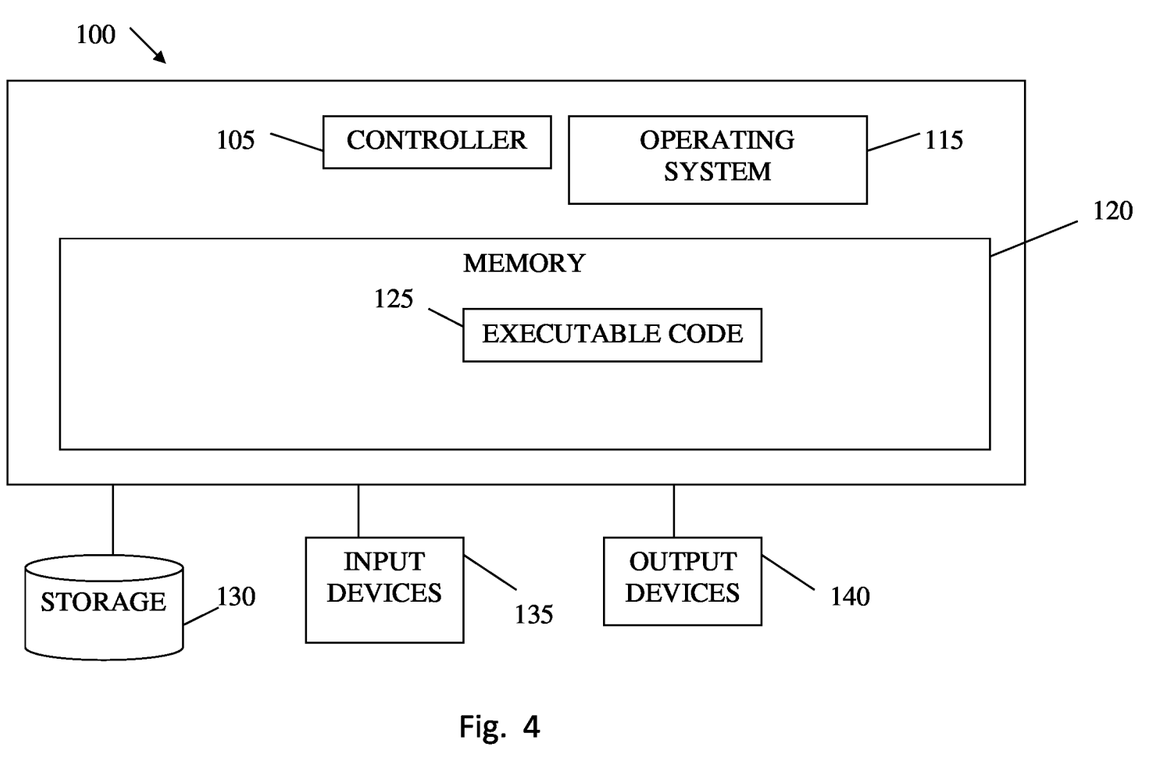
FIG. 4 shows a high-level block diagram of an exemplary computing device according to some embodiments of the present invention.

FIG. 3 is a flowchart depicting a method for deploying, editing and controlling software, according to embodiments of the invention. The operations of FIG. 3 may operate with components such as shown in FIGS. 1, 2 and 4, but may operate with other components.

In operation 300, a set of components may be bundled or added to an application container. For example, a process may save or bundle into a data structure such as a container an executable application (e.g. code which may be executed by a processor); source code used to produce the executable application (e.g., readable and editable source code, such as in the language C #, or another language); a code editor; and a server to control execution of the executable application and to build the executable application. An operating system may be part of a base image and may already exist in the container. In some embodiments, operation 300 may be preceded with an operation of creating a container; in other embodiments a pre-existing container, possibly including some components such as an RCBD module, may be copied and re-used.

In operation 310, the container may be deployed to a deployment or execution environment. e.g. computer 40 of FIG. 1.

In operation 320, a user may use the code editor (e.g. the editor in the container) to edit the source code. The code editor may communicate with a remote process to edit the source code to produce updated source code. The user may cause the source code to be saved in the container. For example, a user may provide input to a process remote from the code editor, e.g. a web browser; the web browser may communicate with the code editor via a network (e.g. the Internet) and via HTTP and the browser may provide editing functionality to accept input from a user to edit the source code. In one embodiment, the user finds the correct container using the name, URL, or other identifier for the container (and the browser may connect with the code editor via a URL), and may access the editor within the container (the container in one embodiment includes an app folder (including the executable code) and an RCBD folder). Other structures for containers may be used. Entities in the RCBD such as a server and editor may execute at the same time that the executable code in the container executes.

In operation 330, a user may provide a command to build and/or execute the updated code; in other embodiments other triggers may be used.

In operation 340, an updated version of the executable application may be built or compiled using the updated source code. e.g. in response to a user command. In one embodiment this is performed by a server in a container, but may be performed by another process. The built code, e.g. artifacts, may be saved in the container, e.g. in a directory.

In operation 350 execution of the prior or existing (e.g. currently executing) executable application may be stopped, e.g. by the server in the container.

In operation 360 the prior executable application may be replaced with the updated version of the executable application, e.g. in the appropriate folder in the container.

In operation 370 execution of the updated version of the executable application—e.g. as built in operation 340—may be started, e.g. by the server in the container.

Other or different operations may be used.

Embodiments may allow for development, e.g. using an RCBD, for a team of developers. Multiple members in a team may work on different features of the same application source code. Embodiments may support this by executing multiple instances of the same RCBD enabled container, each instance dedicated to or associated with one developer in the team. The RCBD code editor may be accessed by container instance specific URL. Embodiments may package a change system like the Git software management system within an RCBD module to allow developers to pull and push changes from a repository. In one implementation, a main instance of the RCBD application container may by accessed via a load balancer URL within a development environment. A team wishing to access another team's containerized application may do so, for example, via the URL of a load balancer process. A set of dedicated RCBD enabled application containers may be used by developers. e.g. in a team, via an IP address or an instance-specific URL. If a developer wants to test their changes against a consuming application they can make the load balancer point to the instance of the RCBD enabled application container associated with that developer.

One of the major problems such an embodiment may solve is that of dependencies. Doing development locally means that the developer may need to have access to all the dependencies for the application. Examples of dependencies include:

Secrets
Database access
Permission to call target endpoints

Setting these up may require time and effort, especially when it involves raising requests with an infrastructure team for provisioning these for local development. Some teams may follow bad practices of checking in secrets in the remote code repository on a change management system like the Git system.

Embodiments allowing for development using containers such as RCBD enabled containers may allow developers to focus on doing development and not setting up provisional requirements, as these may be taken care by the infrastructure teams, which may be able to set up a small number of environments. e.g. a QA environment, as opposed to for each and every developer. Moreover, whenever a new developer joins a team, for them to start development, all that is required in one embodiment is to spawn off a new RCBD enabled container instance. Embodiments may also make it easier for infrastructure teams, as they may not have to constantly fulfill provisioning requirements for each developer. For example, the infrastructure teams may provide access to the RCBD enabled container to the database, and not have to perform further work such as providing access to each developer (e.g., username) on the team.

One embodiment includes a watchdog process. During initial development there may be phases when the application crashes on startup. One such example is when the application does not find a server certificate on start-up. In such cases developers obtain remote access into the container to perform diagnosis, which requires the developers to have appropriate permissions. This can be a time-consuming operation. In one embodiment, a lightweight server in an RCBD module can help overcome this. Since the server in the RCBD module may handle starting and stopping the application process, it can capture logs emitted by the application on standard output during start-up. These logs can be made available on one of the endpoints exposed by the server in the RCBD module.

Reference is made to FIG. 4, showing a high-level block diagram of an exemplary computing device according to some embodiments of the present invention. Computing device 100 may include a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may be, or act as the components of, a system according to embodiments of the invention.

Various components, computers, and modules of FIG. 1 may be or include devices such as computing device 100, and one or more devices such as computing device 100 may carry out functions such as those described in FIG. 3. For example, one computing device (e.g. computer 30) may bundle components into a container; and a different computing device (e.g. computer 40) may execute a code editor so the code editor edits source code and may also execute a server to build and execute an updated version of an executable application.

Operating system 115 may be or may include any code segment (e.g., one similar to executable code 125) designed and/or configured to perform tasks involving coordination, scheduling, arbitration, or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a cache memory, a short or long term memory unit, or other suitable memory or storage units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. A system according to some embodiments of the invention may include a one or more executable code segments similar to executable code 125 that may be loaded into memory 120 or another non-transitory storage medium and cause controller 105, when executing code 125, to carry out methods described herein.

Storage system 130 may be or may include, for example, a hard disk drive, a CD-Recordable (CD-R) drive, a universal serial bus (USB) device or other suitable removable and/or fixed storage unit. Some of the components shown in FIG. 4 may be omitted.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, or any other suitable computing device. A system as described herein may include one or more devices such as computing device 100.

In some embodiments, a container packaging RCBD is not used in a production environment, e.g. to avoid a security risk, and is used instead in environments such as test environments. However, some embodiments may use an RCBD container in a production environment. An RCBD may function such that it serves (e.g., is accessed and functions) over HTTPs, but other ways of accessing RCBD and an editor may be used. Appropriate changes may be made to firewall rules on the machine on which the container executes, e.g. to make the RCBD server URL accessible to a developer. e.g. via a browser. An RCBD server URL may be access protected, e.g. via appropriate authentication mechanisms. An RCBD may have permission to terminate and start an application from within the container, e.g. the container may include an operating system giving permissions to the server to start and stop the application. An RCBD may have permission to write files in the application deployment location in the container. A code editor served by an RCBD server (e.g. over https) may have user interface (UI) support to do a build and copy the built artifacts to the target location. The deployment environment (e.g. QA, test, or other environment) executing the container in one embodiment typically has enough resources to support executing the RCBD in parallel to executing the application in the container. In some embodiments, users may wish to avoid deploying an RCBD container in performance testing environments; however, some embodiment may use such containers in such environments or production environments. For example, for some business-critical applications packaging an RCBD container in a production environment might be beneficial in production in some break the glass scenarios. When this is done, appropriate security checks and balances may be put in place, and rather than a lightweight server, a production worthy server may be used in the RCBD. A change management tool such as Git can be added as part of RCBD which allows the developers to commit their code to a branch.

Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for deploying and editing software, the method comprising, using one or more computer processors:
   bundling, using a processor of the one or more computer processors, in an application container an executable application;
   source code used to produce the executable application;
   a code editor; and
   a server to control execution of the executable application and to build the executable application;
   the code editor communicating with a remote process, a user interacting with and providing input to the remote process, to edit the source code to produce updated source code; and
   the server building an updated version of the executable application,
   stopping execution of the executable application,
   replacing the executable application with the updated version of the executable application, and
   starting execution of the updated version of the executable application;
   wherein the remote process is a browser connecting with the code editor via a uniform resource locator (URL), the browser providing editing functionality to accept input from a user to edit the source code;
   wherein the application container comprises a build tool.

2. The method of claim 1, wherein the server builds the updated version of the executable application using the updated source code.

3. The method of claim 1, wherein the application container comprises:
   an application directory comprising the executable application; and
   a build and deploy directory comprising the source code; the code editor; and the server.

4. The method of claim 1, wherein the server and executable application execute in the container.

5. The method of claim 1, wherein the server serves the code editor.

6. The method of claim 1, wherein the server building an updated version of the executable application comprises the server compiling the updated source code.

7. A system for deploying and editing software, the system comprising a memory comprising an application container comprising:
   an executable application;
   source code used to produce the executable application;
   a code editor; and
   a server to control execution of the executable application and to build the executable application; and
   a processor configured to: execute the code editor se the code editor communicates with a remote process to edit the source code to produce updated source code,
   a user interacting with and providing input to the remote process; and
   execute the server so the server builds an updated version of the executable application, stops execution of the executable application,
   replaces the executable application with the updated version of the executable application, and
   starts execution of the updated version of the executable application;
   wherein the remote process is a browser connecting with the code editor via a uniform resource locator (URL), the browser providing editing functionality to accept input from a user to edit the source code;
   wherein the application container comprises a build tool.

8. The system of claim 7, wherein the server builds the updated version of the executable application using the updated source code.

9. The system of claim 7, wherein the application container comprises:
   an application directory comprising the executable application; and
   a build and deploy directory comprising the source code; the code editor; and the server.

10. The system of claim 7, wherein the server and executable application execute in the container.

11. The system of claim 7, wherein the server serves the code editor.

12. The system of claim 7, wherein the server building an updated version of the executable application comprises the server compiling the updated source code.

13. A method for deploying and editing software, the method comprising, using one or more processors:
   a code editor executed by a processor of the one or more processors and comprised in an application container and
   communicating with a remote process to edit source code comprised in the application container and producing updated source code,
   a user interacting with and providing input to the remote process; and
   a server executed by a processor of the one or more processors and comprised in the application container and using the updated source code to compile an executable application to produce an updated executable application,
   stopping the executable application,
   replacing the executable application with the updated executable application, and
   starting execution of the updated executable application;
   wherein the remote process is a browser connecting with the code editor via a uniform resource locator (URL), the browser providing editing functionality to accept input from a user to edit the source code;
   wherein the application container comprises a build tool.

14. The method of claim 13, wherein the application container comprises:
   an application directory comprising the executable application; and
   a build and deploy directory comprising the source code; the code editor; and the server.

15. The method of claim 13, wherein the server and executable application execute in the container.

16. The method of claim 13, wherein the server serves the code editor.

* * * * *